United States Patent
Manning

(10) Patent No.: US 6,791,031 B1
(45) Date of Patent: Sep. 14, 2004

(54) ELECTRICAL CONDUIT FITTING AND METHOD

(76) Inventor: James C. Manning, 5594 S. Beebe Dr., Rochelle, IL (US) 61068

( * ) Notice: Subject to any disclaimer, the term of this patent is extended or adjusted under 35 U.S.C. 154(b) by 0 days.

(21) Appl. No.: 10/455,569

(22) Filed: Jun. 5, 2003

(51) Int. Cl.⁷ .................................................. H02G 3/18
(52) U.S. Cl. ...................... 174/65 R; 174/48; 174/68.1; 285/312; 285/81
(58) Field of Search .......................... 174/48, 50, 65 R, 174/65 SS, 68.1, 135; 138/177, 103, DIG. 11, 155; 285/423, 19, 20, 333, 312, 38, 81, 87, 85, 80

(56) References Cited

U.S. PATENT DOCUMENTS

| | | |
|---|---|---|
| 30,909 A | 12/1860 | Button et al. |
| 1,261,687 A | 4/1918 | Brandon |
| 1,796,846 A | 3/1931 | Kanner |
| 2,033,142 A | 3/1936 | Lewis |
| 3,314,698 A | 4/1967 | Owens |
| 3,439,942 A * | 4/1969 | Moore et al. ............... 285/312 |
| 3,633,942 A | 1/1972 | Meyerhoefer |
| 3,860,274 A | 1/1975 | Ledstrom et al. |
| 4,059,296 A | 11/1977 | Panourgias |
| 4,190,222 A | 2/1980 | Appleton et al. |
| 4,254,973 A | 3/1981 | Benjamin |
| 4,555,131 A | 11/1985 | Weinhold |
| 4,621,166 A | 11/1986 | Neuroth |
| 4,691,942 A | 9/1987 | Ford |
| 4,802,694 A * | 2/1989 | Vargo ......................... 285/312 |
| 5,132,493 A | 7/1992 | Sheehan |
| 5,374,017 A | 12/1994 | Martin et al. |
| 5,435,604 A * | 7/1995 | Chen .......................... 285/312 |
| 5,664,904 A | 9/1997 | Hapgood et al. |
| 5,791,694 A * | 8/1998 | Fahl et al. .................. 285/312 |
| 5,816,623 A | 10/1998 | Chang |
| 5,863,079 A | 1/1999 | Donais et al. |
| 5,904,380 A | 5/1999 | Lee |
| 5,927,760 A * | 7/1999 | Rocha ......................... 285/312 |
| 6,089,619 A * | 7/2000 | Goda .......................... 285/312 |
| 6,100,470 A | 8/2000 | Gretz |
| 6,120,065 A | 9/2000 | Chen |
| 6,183,293 B1 | 2/2001 | Kieninger |
| D441,849 S | 5/2001 | Plewa vom Berg |
| 6,224,113 B1 * | 5/2001 | Chien ......................... 285/312 |
| 6,257,939 B1 | 7/2001 | Courtois et al. |
| 6,364,369 B2 * | 4/2002 | Bailey ........................ 285/312 |
| 6,498,295 B1 | 12/2002 | Akiyama et al. |
| 2002/0157853 A1 | 10/2002 | Burton et al. |

OTHER PUBLICATIONS

Russell C. Hibbeler "Mechanics of Materials", 1994, Macmillan, 2$^{nd}$Edition, p. 67.*

CHS Controls, Installation Products—Commercial Grade, p. 4 (of 8) at www.chscontrols.se/pdf/pm3045e.pdf (last visisted Jun. 19, 2003).

* cited by examiner

Primary Examiner—Chau N. Nguyen
Assistant Examiner—Angel R. Estrada
(74) Attorney, Agent, or Firm—Leydig, Voit & Mayer, Ltd.

(57) ABSTRACT

A fitting for an electrical conduit uses a cam lock arrangement. The fitting has an annular pocket for receiving the end of a conduit section. An opening through the wall of the fitting intersects the pocket. The cam lock is mounted so that a cam portion projects through the opening. A lever projecting above the body of the fitting rotates the cam lock to cause it to engage and indent an inserted conduit section to lock the conduit section in place. A method is provided by which conduit sections can be joined using only a single tool, such as a pair of slip joint channel pliers.

15 Claims, 8 Drawing Sheets

ELECTRICAL CONDUIT FITTING AND METHOD

FIELD OF THE INVENTION

This invention relates to electrical conduit, and more particularly to conduit fittings, including couplings and connectors, and a method for making junctions to and between metal conduit.

BACKGROUND OF THE INVENTION

Electrical conduit forms the backbone of the wiring system in many buildings, both commercial and residential. It is generally believed to be the highest quality and safest installation mechanism, because the wires which carry the electrical current throughout the structure are totally enclosed within the conduit system.

Metal conduit can be of several varieties, including Electrical Metallic Tubing (EMT), Intermediate Metallic Conduit (IMC) and rigid conduit. Such conduit comes in standard lengths such as ten feet, can be secured in place and bent to form corners, all in customizing the electrical backbone system for a building. Sections are readily cut by ordinary hand tools and bent with special conduit benders to fit a particular application.

EMT conduit sections have no fittings at the ends. IMC and rigid conduit sections are manufactured with threaded ends. However, when the particular application requires the conduit section to be cut to a shorter length, all three forms of conduit will have at least one unthreaded end with no fittings.

Thus when joining the conduit end to end, a fitting known as a coupling is required to join the sections. Also when joining a section of conduit to a fixture, a distribution box, a junction box or the like, a fitting known as a connector is necessary. The fitting is secured to the conduit at one end and to the fixture or other device at the other end. These types of conduit fittings are known generally as threadless fittings.

In the past, three types of threadless fittings have been available for making junctions and securing conduit to fixtures and the like. Each has its limitations. First is the indenter type, which has a sleeve that fits over the conduit and then is crimped using a special hand tool. This type of fitting is not much used today and requires use of a special tool.

The second type of fitting is a compression fitting. This fitting generally has a sleeve with threads on the outside, a gland and a nut. As the nut engages the threads and tightens, it presses the gland in between the sleeve and the conduit. The gland compresses around the conduit and engages the outer surface of the conduit and the inner surface of the sleeve to make a secure junction. Unfortunately, in order to fit this type of fitting to a section of conduit requires the use of two pairs of channel pliers, which can sometimes be awkward.

The third type of fitting, and the one commonly used today, is the set screw type arrangement. The end of a conduit section is slipped into a pocket in the fitting, and a set screw tightened to get a reasonably good mechanical joint between the fitting and the conduit. In a coupling for end to end connections, two pockets and two set screws would be provided, one for each section of conduit. In a connector for junction box applications, one end would be threaded to accept a conventional lock nut, while the other end would have the pocket and set screw as described above.

The problems with set screw type fittings are the possibility of not tightening the screw as an oversight or the set screw loosening, which tend to reduce the integrity of the overall conduit system. An installation problem that is present is even more significant. Usually an electrician when setting up a conduit run will extensively use a pair of channel type pliers for fitting the items together. But whenever a connection needs to be made, the electrician must then put the channel pliers back in his pouch and take out a screwdriver to make the connection. This constant switching between tools, while it would not seem to be terribly significant, can result in a significant loss of efficiency and time in making a large installation.

BRIEF SUMMARY OF THE INVENTION

In view of the foregoing, it is a general aim of the present invention to provide a fitting system for conduit which not only provides for a secure conduit installation, but which simplifies the installation task.

In that regard, a more detailed object is to provide a conduit fitting having a lock mechanism which is simpler and less complex than those provided heretofor.

It is a feature of the invention that the fittings typically used with EMT conduit, can also be used with the other forms of metallic conduit, such as IMC and rigid conduit, which when manufactured have threaded ends but when cut for a particular application have unthreaded smooth ends without fittings.

With respect to the method aspects of the invention, an object is to provide a method for connecting a conduit section into a conduit assembly which can, if desired, be accomplished with a single tool.

In accomplishing its aims and objectives, the invention provides a fitting for metallic conduit which comprises a body having an annular pocket with a central axis, the pocket being dimensioned to slide onto a smooth end of a conduit section. The body has an opening and a cam support on the body adjacent the opening. A cam lock is pivotably fixed in the cam support. The cam lock has a cam surface on one end and an opposite end for rotation of the cam surface about the pivot point. The cam lock is pivotable in the earn support between (i) a locked position in which the cam surface protrudes through the opening sufficiently to deform the surface of a conduit section when inserted and thereby lock the fitting and conduit section together, and (ii) an unlocked position in which the cam is withdrawn sufficiently into the opening to allow insertion or removal of the conduit from the annular pocket.

It is a feature of certain embodiments that the cam lock also has an intermediate position in which the cam surface protrudes through the opening but not so far as in the locked position. It protrudes sufficiently far to engage a conduit section when positioned in the pocket for preliminarily locking the fitting and conduit section together.

It is a further feature that the cam lock has at least one projection, and in some cases multiple serrations, positioned to engage the surface of a conduit section when being locked in the fitting. The projection or serrations tend to render the locking action more positive.

The invention also has method aspects which involve using a single tool to connect a conduit section into a conduit assembly. The method includes the steps of providing a conduit fitting which has a cam lock arrangement with a pivot lock having a cam surface on one end for locking/ releasing the conduit section, and an operating lever on the other end. The conduit is inserted into the fitting to the appropriate position. The method also involves holding the conduit and fitting in the appropriate position and moving the operating lever to achieve a preliminary grip on the conduit. Finally, the method involves clamping the operating lever toward the fitting body to drive the cam into the conduit surface thereby to lock the fitting and conduit together.

Preferably the inserting and clamping steps utilize a single tool, generally a pair of channel pliers normally used by electricians installing conduit.

These and other objects advantages of the invention, as well as additional inventive features, will be apparent from the description of the invention provided herein.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
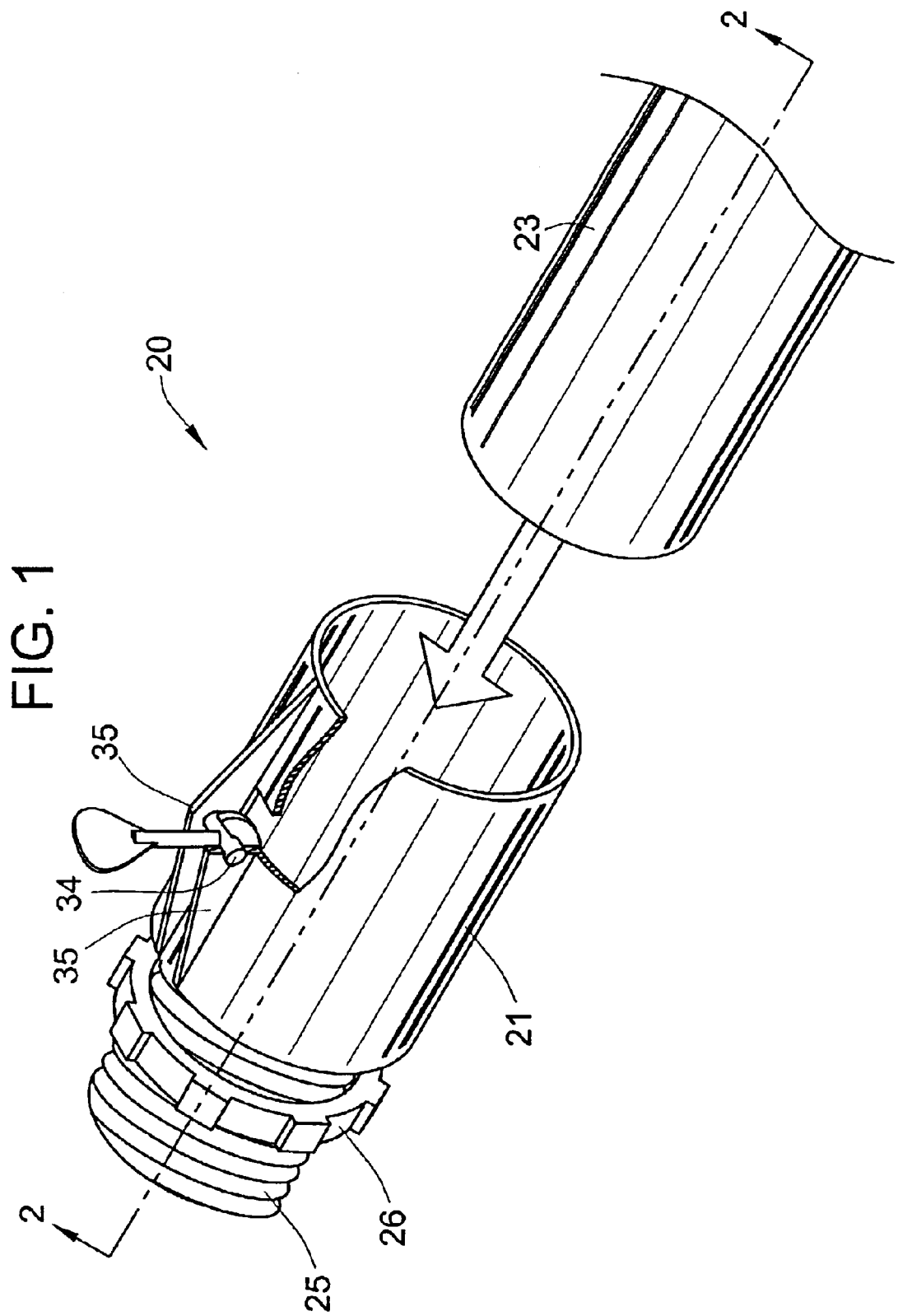
FIG. 1 is a perspective view showing the fitting, with a conduit section inserted but unlocked.
Figure 2:
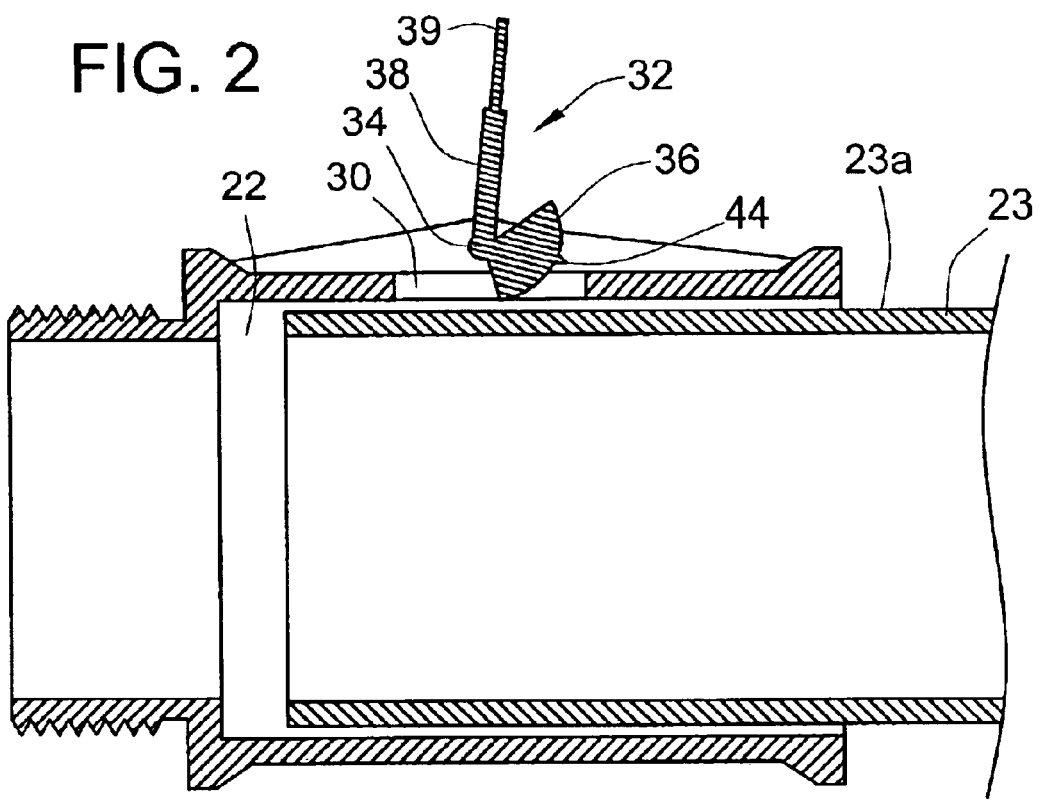
FIG. 2 is a sectional view taken generally along the line 2—2 of FIG. 1.

Turning now to the drawings, FIGS. 1 and 2 illustrate an exemplary embodiment of a conduit fitting 20 constructed in accordance with the present invention. The fitting 20 has a metallic body portion 21 having an annular pocket 22 (see FIG. 2) formed on the inside thereof. A conduit section 23, shown outside the connector 20 in FIG. 1, is inserted into the pocket 22 as indicated by the arrow in FIG. 1 to assume the approximate position shown in FIG. 2.

The conduit section 23 will have a smooth outer surface. The smooth outer surface is formed either as a result of manufacturing, as with EMT conduit or while using IMC or rigid conduit, which has unsmooth threaded ends, a smooth surface is formed when the conduit is cut to reduce the length of the section 23 as required for a particular application.

The fit of the pocket for the conduit section 23 is such that the conduit can be slipped into the pocket without significant effort, but close enough that the locking mechanism, to be described below, is effective to maintain the integrity of a conduit system when installed with fittings 20.

The illustrated fitting is of the type adapted to be attached to a junction box, fixture or the like, and the fitting is known as a connector. It has a threaded section 25 and a nut 26 at the rear end thereof. The nut 26 is removed, the conduit fitting 20 inserted through an opening in the junction box, then the nut 26 attached and then tightened to fix the fitting 20 to the box. As will be described below, other fitting configurations are also contemplated, a common one being a coupling in which two conduit lock mechanisms are supplied on opposite ends of a common body, for the purpose of joining two conduit sections together. Other forms, such as elbows and the like are also contemplated.

The body 21 of the fitting has an opening 30 formed therein for receipt of the cam lock arrangement generally indicated at 32. Preferably the opening 30 is a rectangular slot which is parallel to the axis of the pocket 22.

In the illustrated embodiment, the cam lock 32 is a simple pivotable device mounted about a pivot 34 fixed in a pair of flanges 35 which are set in or on the body 21 of the fitting 20. One end of the cam lock 32, below the pivot 34, includes a cam surface 36 which is shaped to progressively engage the outer surface 23a of a conduit section 23 when inserted in the pocket 22. The other end of the cam lock 32 comprises a pivot lever 38 which is manipulateable to cause the cam lock 32 to rotate about the pivot 34 and engage the cam surface 36 with the surface 23a of the conduit 23.

Figure 3:
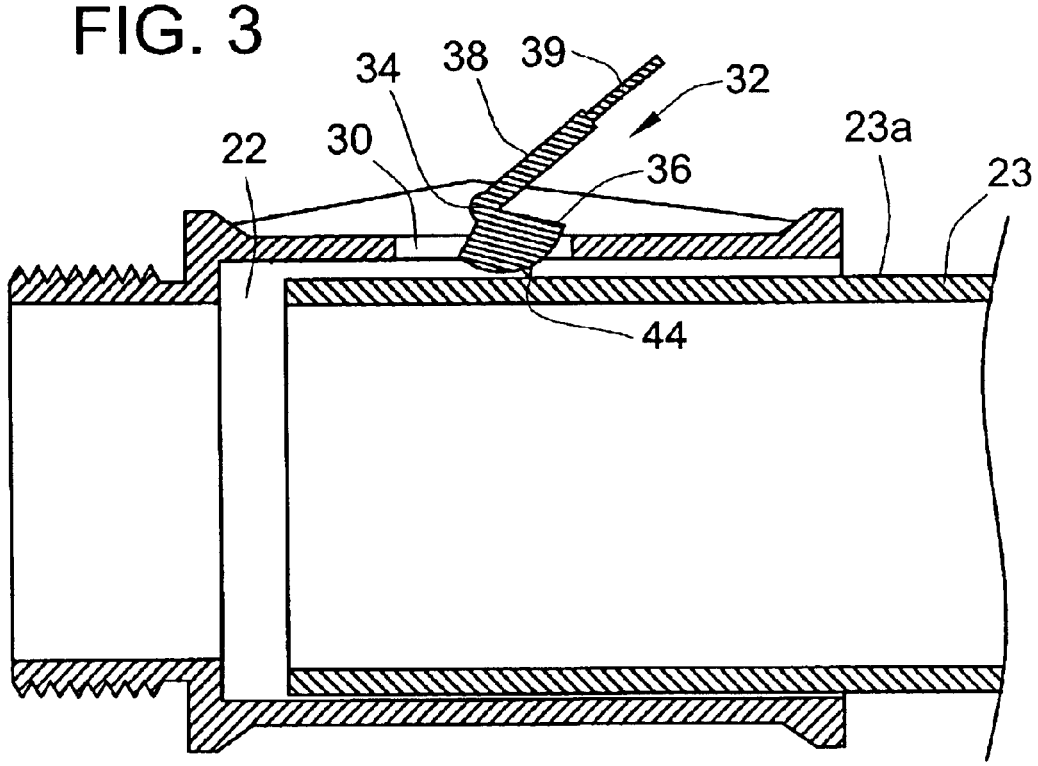
FIG. 3 is a partial sectional view showing the cam lock of FIG. 2 rotated to an intermediate partially locked position.
Figure 4:
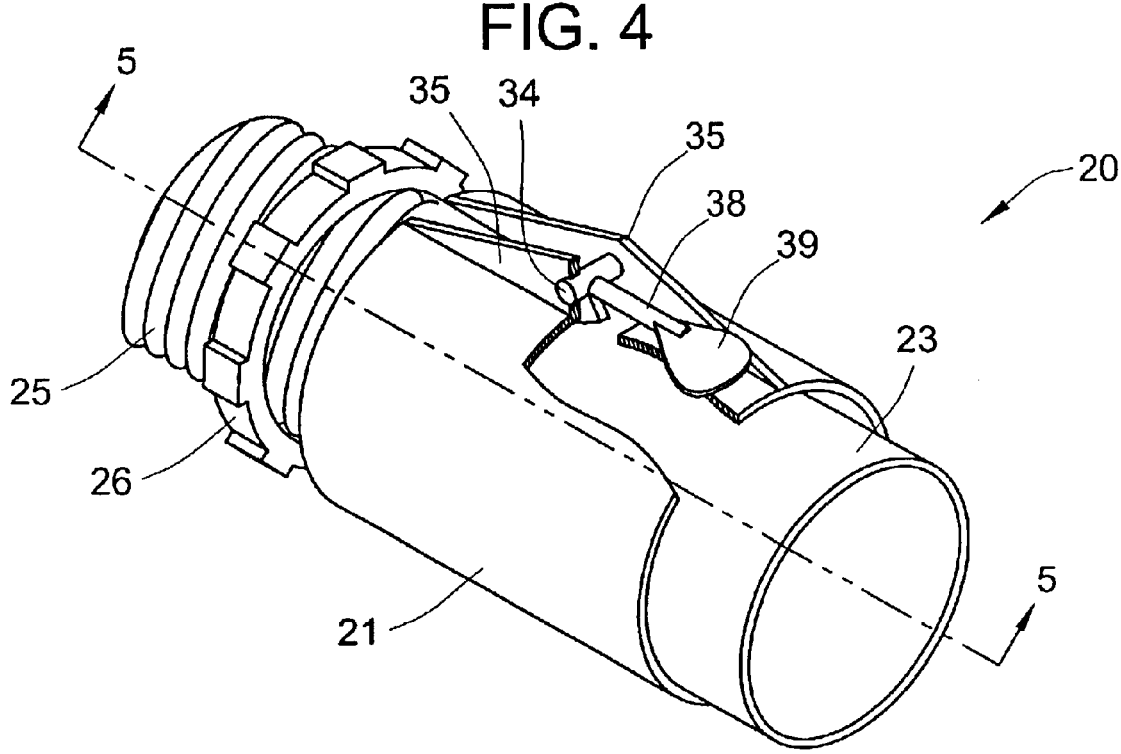
FIG. 4 shows the conduit fitting of FIG. 1 with the cam lock locked.
Figure 5:
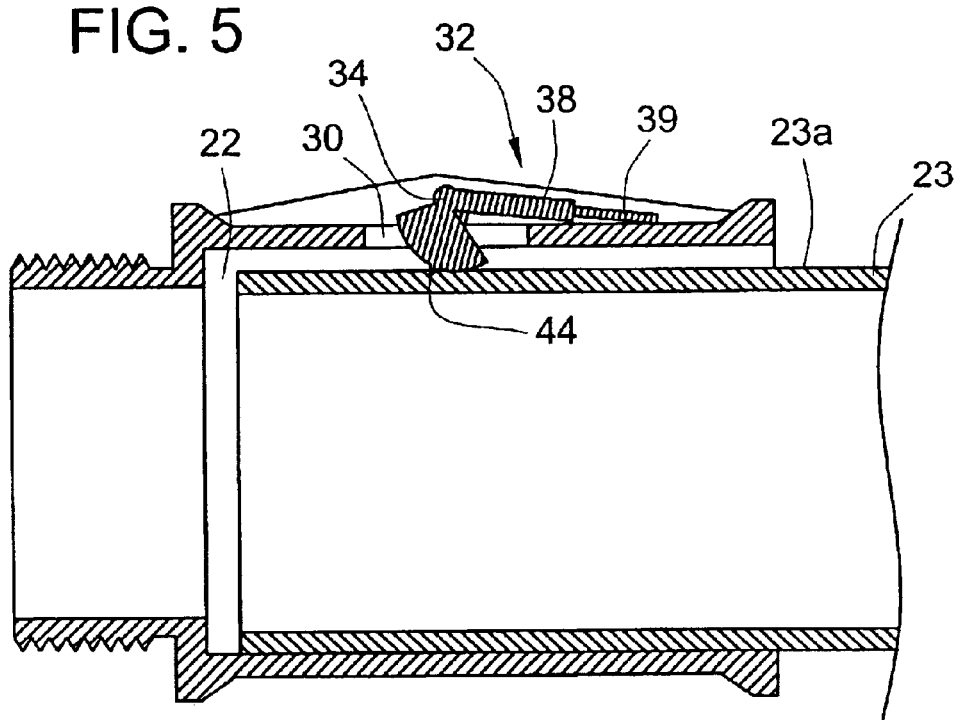
FIG. 5 is a sectional view taken generally along the line 5—5 of FIG. 4.

FIGS. 1 and 2 show the unlocked condition of the cam lock 32 in which the conduit 23 has sufficient clearance to slide into the pocket 22. FIG. 3 is a partial view which shows an intermediate position in which the cam lock 32 is rotated sufficiently clockwise (as seen in FIG. 3) to cause the surface 36 of the cam to begin to engage to the surface 23a of the conduit 23. This will sometimes be referred to herein as a preliminary locked condition. FIGS. 4 and 5 show the fully locked condition in which the cam lever 38 is pivoted downwardly to a home position, preferably near the body 21. FIG. 5 shows the cam strongly engaging the surface 23a, forcing the conduit to sit low in the pocket, and indenting the surface of the conduit where engaged by the cam. The center point 34 of the pivot 34 is positioned with respect to the cam surface 36 in the locked position, such that the cam will be "over center" and thus remain in the locked condition unless pried up, preferably with a tool like a screwdriver.

As illustrated in FIGS. 1 and 4, the cam can have an enlarged operating pad 39. However, since the cam is normally operated by tools, such as pliers, the operating pad 39 is not essential, and can be eliminated where desired.

In accordance with a certain feature of the invention, the cam surface 36 is provided with one or more projections or serrations which serve to increase the positive action of the lock. FIGS. 2 and 5 show a single projection 44 positioned on the cam surface such that the projection 44 engages the conduit 23 as the lever 38 is rotated toward the home position. The engagement preferably occurs, however, before the home position is reached, such that continued pivoting of the cam lock to the home position (FIG. 5) causes the projection 44 to carry the conduit slightly forward into the pocket, increasing the positive aspect of the lock.

Figure 6:
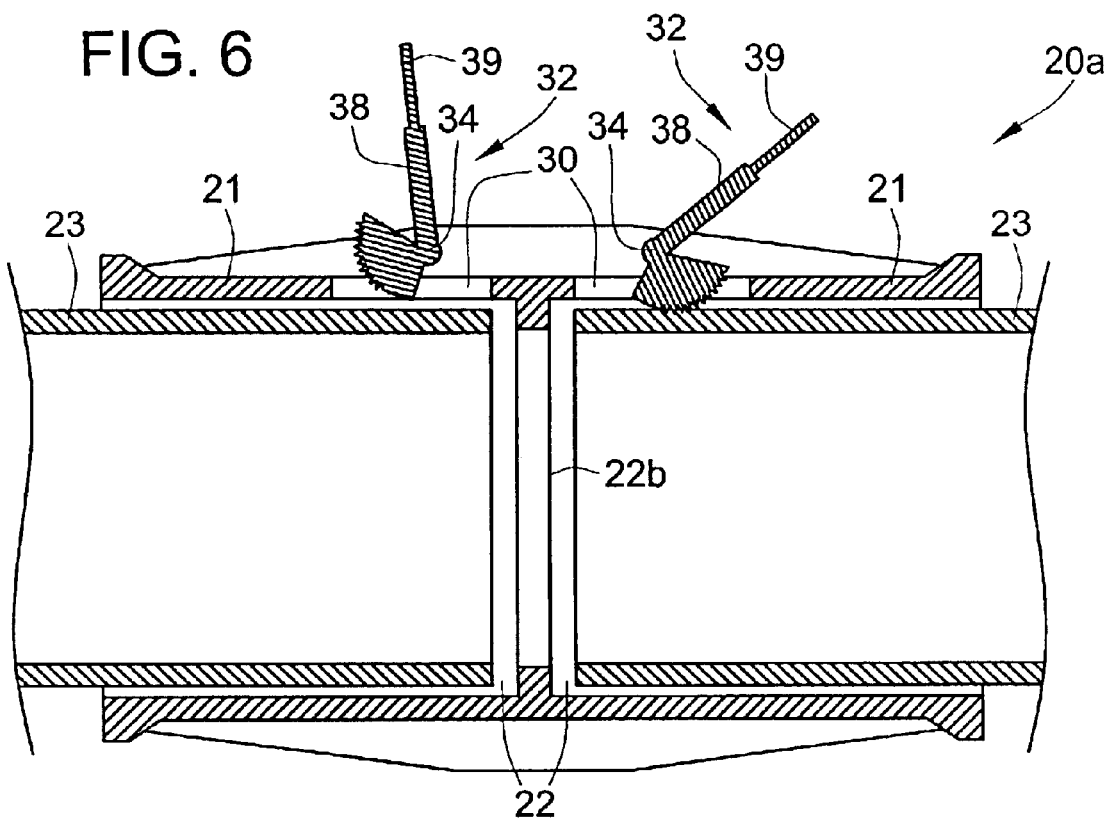
FIG. 6 shows, in cross-section, an alternate embodiment of the invention including multiple serrations on the cam lock, and also illustrating the invention in a conduit coupling form of the fitting.

FIG. 6 shows an alternating embodiment of the invention in which the cam surface 36 is formed with a plurality of serrations 46 which engage and indent the conduit surface 23a. Like the prior embodiment, these serrations can also be arranged to have sufficient interference into the surface to carry the conduit section forward into the pocket as the cam lock 32a is rotated to its home position.

Figure 11:
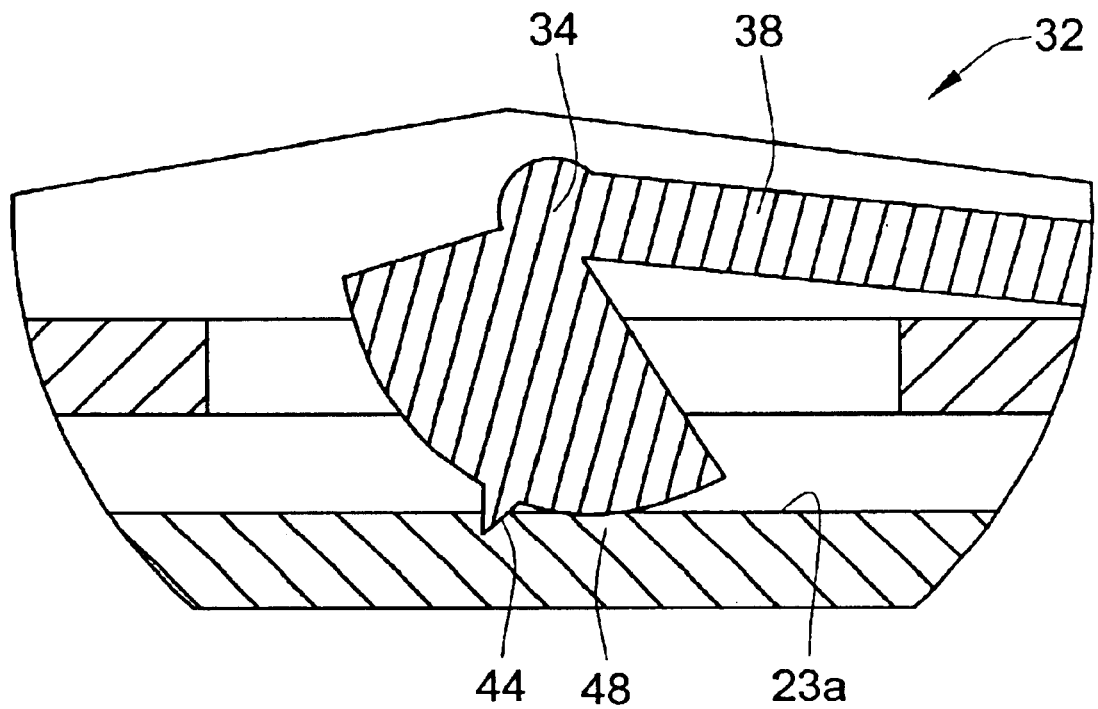
FIGS. 11 and 12 are enlarged views better illustrating the indentation and locking feature of the cam lock.
Figure 12:
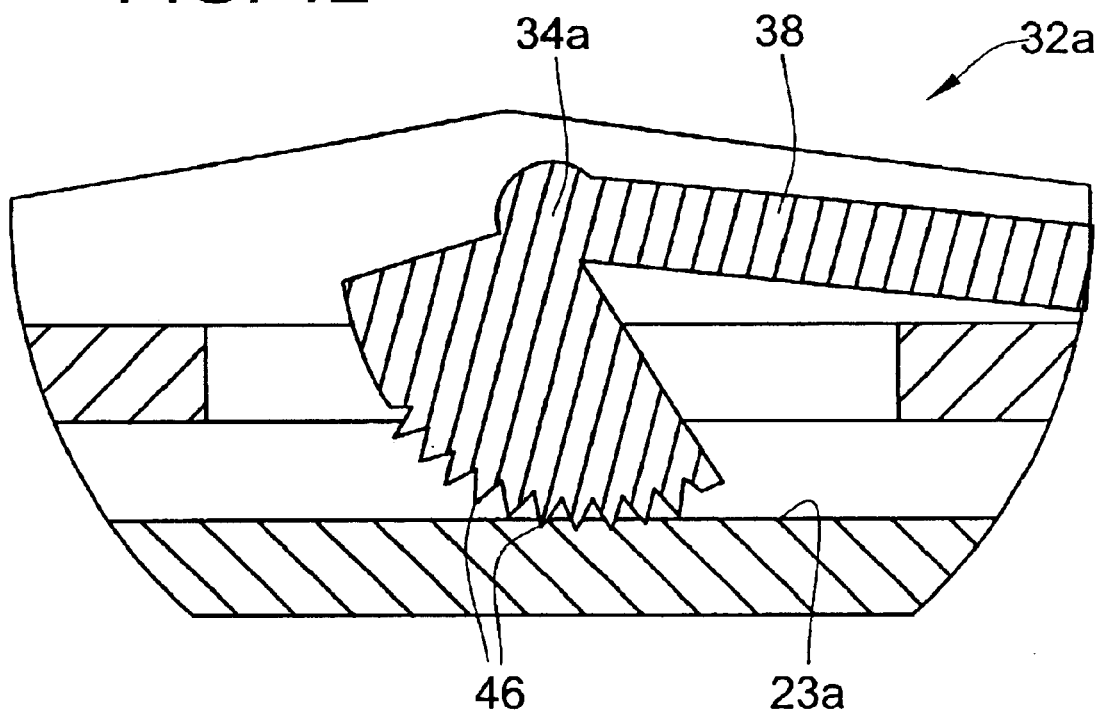

Referring briefly to FIGS. 11 and 12, there will be seen the deformation of the conduit surface 23a which occurs when the cam lock is in its locked position. FIG. 11 shows the single projection 44 projecting into the surface 23a, as well as the portion 48 of the curved cam surface actually projecting into and further indenting the surface 23a of the conduit section 23. This positive indentation of the relatively soft metal conduit surface assures a positive lock and integrity of the conduit system. FIG. 12 shows multiple serrations 46 indenting into the surface of the conduit, also increasing the positive nature of the lock.

FIG. 6 also shows an alternate embodiment of the invention in the type of conduit fitting on which the inventive cam lock is applied. The fitting 20a of FIG. 6 is a conduit coupling. The coupling of FIG. 6 is intended to join two conduit sections 23 of the same diameter. Thus, a pair of pockets 22 is provided separated by a wall 22b. Respective conduit sections are fit into the two pockets. Each pocket has its own opening 30 and its own cam lock 32 (or 32a), depending on the design of the cam lock. The cam lock can be supported, as shown, on a single set of flanges 35, having a pair of pivot points 34 formed therein. Each section of conduit 23 is separately inserted into its associated pocket 22 and locked in place, and when both are locked, the effect is to have two sections of conduit securely joined together.

Figure 7:
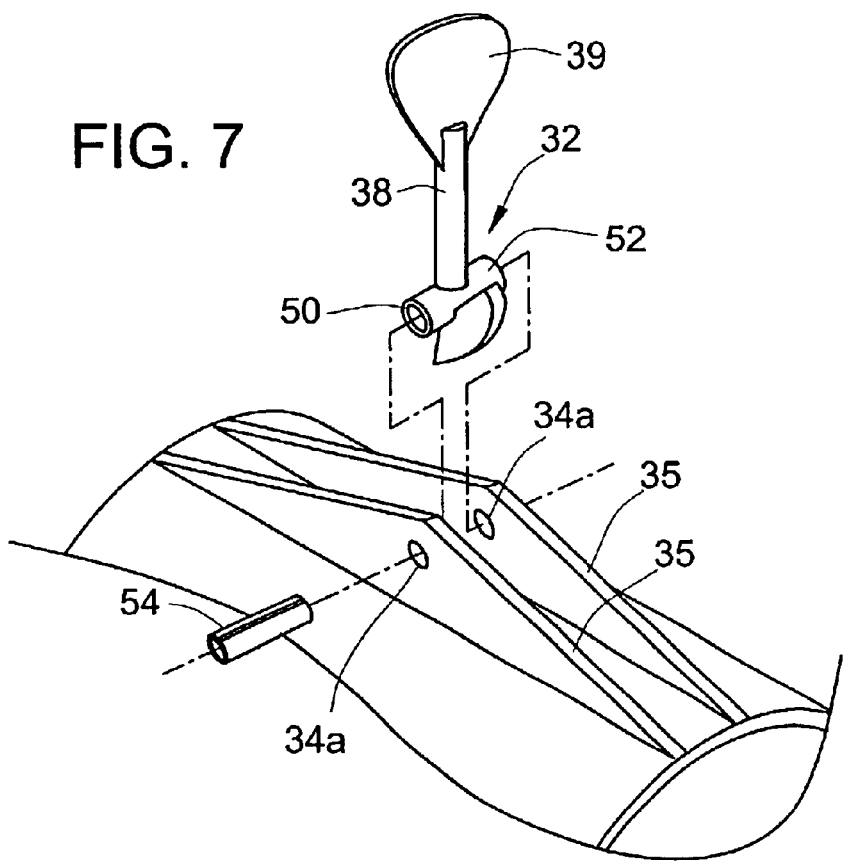
FIG. 7 is a partly exploded view better illustrating the cam lock mechanism.

FIG. 7 illustrates the simplicity of the design in being highly manufactureable and readily inexpensive to produce. A relatively standard conduit fitting body 21 is modified to include the flanges 35 having apertures 34a formed therein as shown. The cam lock mechanism 32 is a single piece which is readily cast or forged. The illustrated embodiment has an aperture 50 formed in the pivot shaft 52 thereof, with the pivot lever 38 also formed thereon. A pivot support 54 is provided for securing the cam lock to the flanges 35. The connector 54 is preferably a split pin which is readily automatically inserted and difficult to remove. Alternatively, particularly if the thickness of the flanges 35 is sufficient, a solid pin having a knurled end is press fit into the flanges, with the knurled section biting into the flanges 35 for holding the pivot point in place. As a simple expedient, one of the flange apertures 34a can be arranged to accept a self threading fastener such as a pan head screw, which can be used to form the pivot mechanism. The end result is a cam lock lever which is pivotably attached to the flanges 35 with the cam portion 36 projecting through the opening 30 between the flanges 35 to cause the locking action which has been described above.

Figure 8:
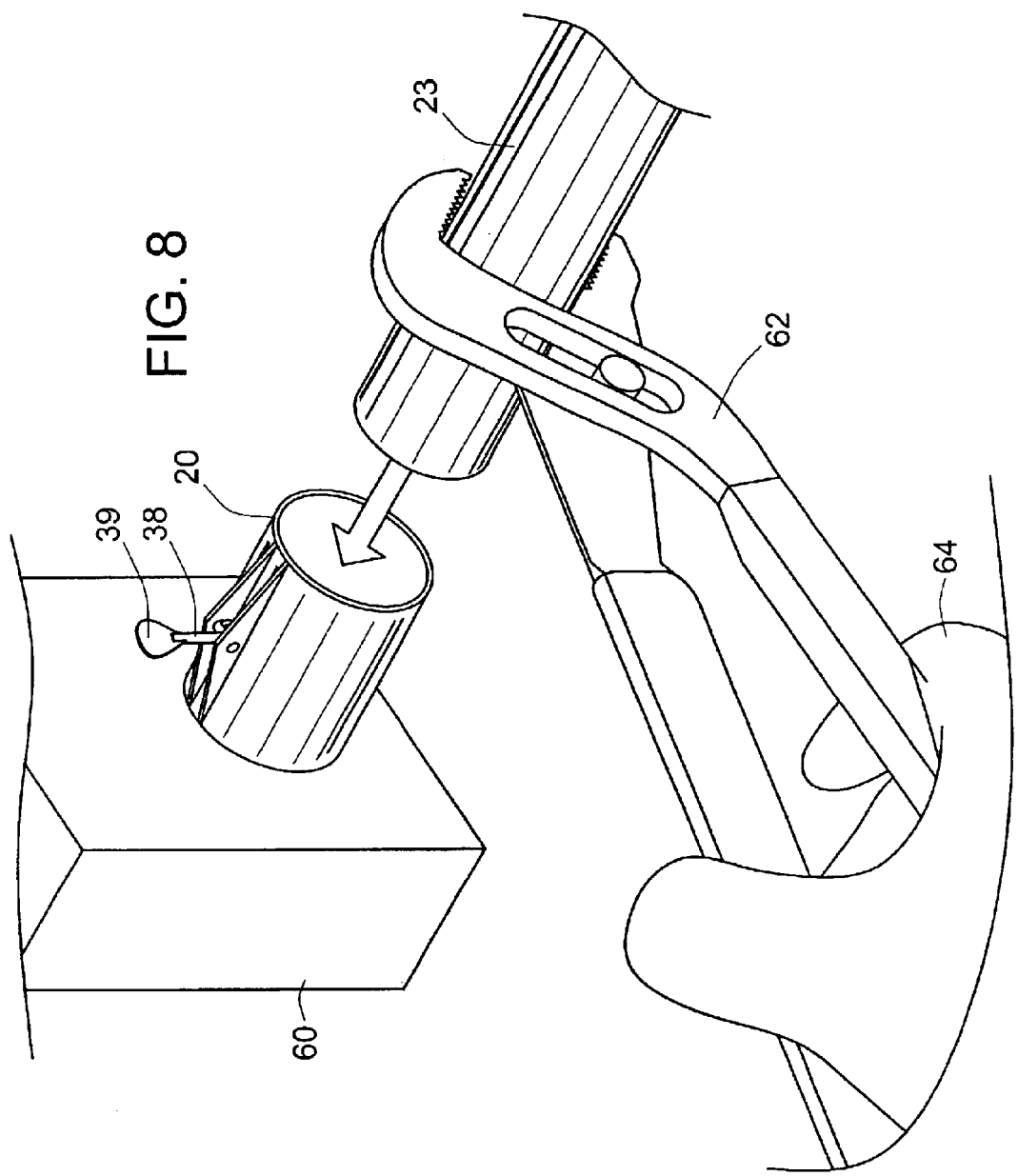
FIGS. 8–10 are diagrams illustrating a preferred method of connecting a conduit section into a system.
Figure 9:
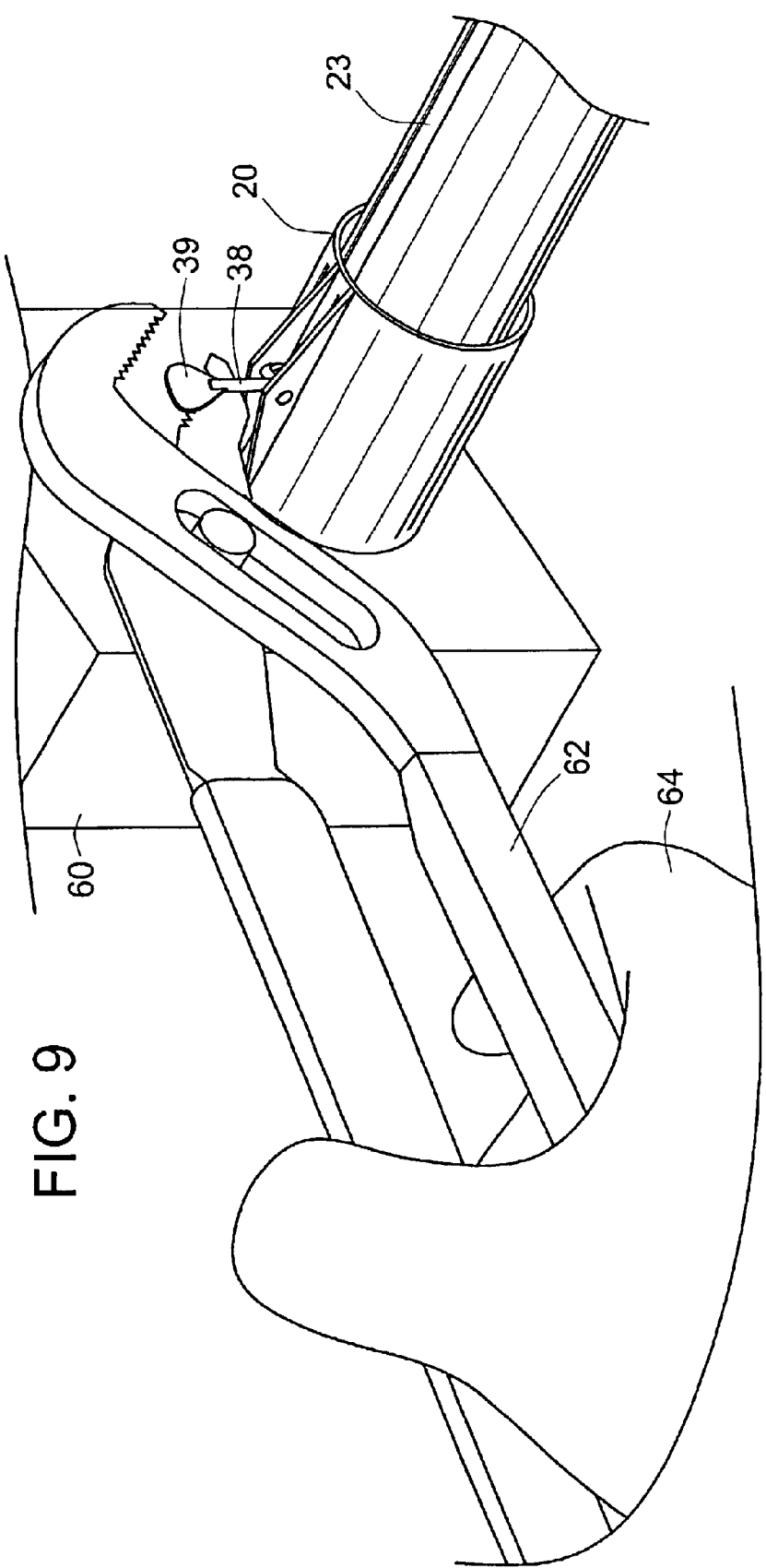
Figure 10:
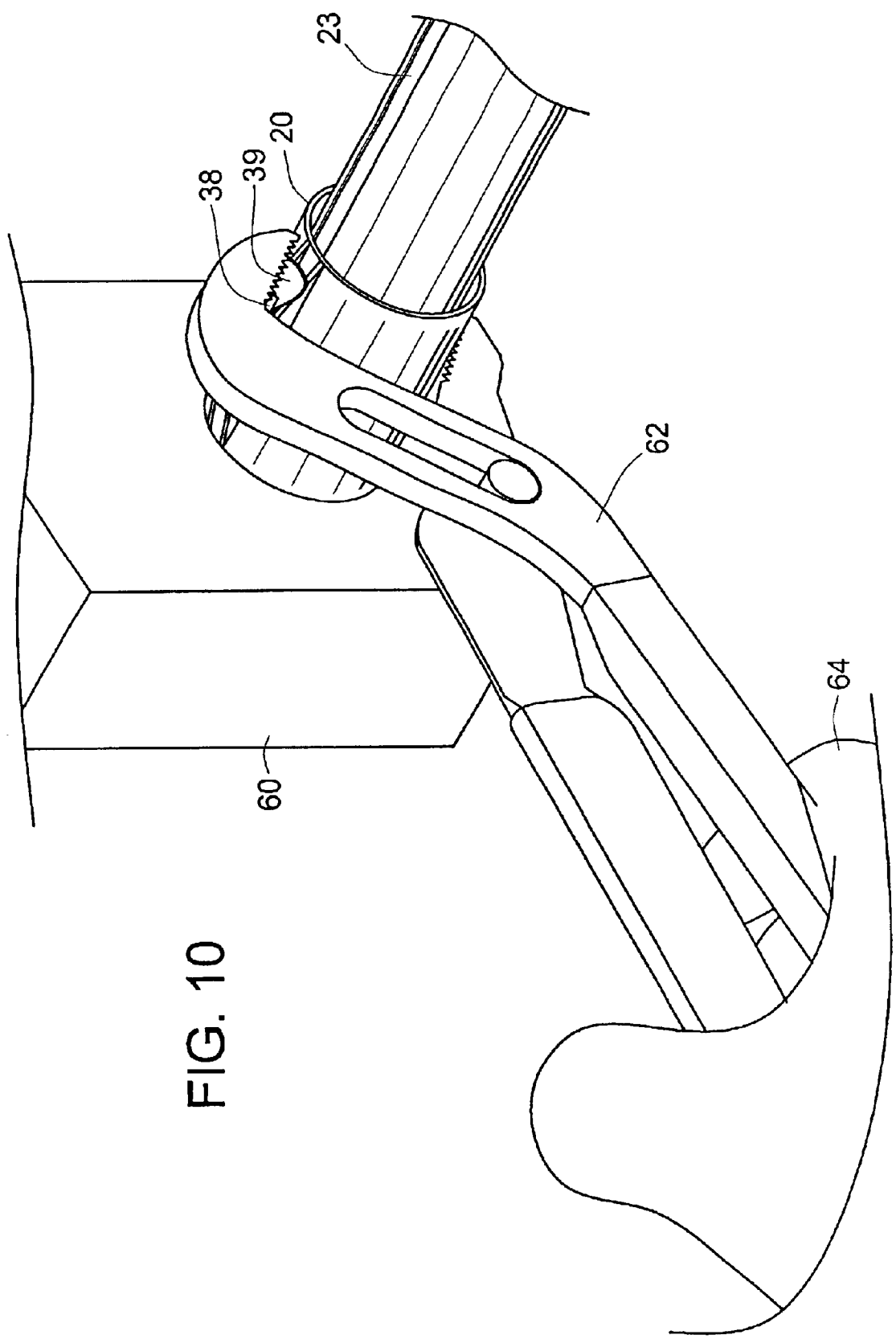

FIGS. 8–10 illustrate certain method aspects of the invention. Those figures illustrate a fitting 20 secured in a junction box 60. A conduit section 23 (only a portion of which is shown) is grasped by a pair of channel pliers 62 manipulated by the hand 64 of an electrician or worker. As shown in FIG. 8, the worker manipulates the conduit 23 to insert it into the pocket in the fitting 20. When the insertion is complete, as shown in FIG. 9, the pliers 62 can be used to tap the end of the lever 38 to bring it to the partially locked position. Thereupon, and without switching grip on the tools, the worker can then use the pliers 62 so that the lower jaw engages the bottom of the fitting and the upper jaw engages the pivot lever 38 near its end as illustrated in FIG. 10. Clamping down on the pliers 62 will then cause the pivoting of the pivot lock to bring it to the home and locked position.

It will be appreciated that the electrician need only use a single tool and by simple manipulation inserts the pipe, taps the connector to a partially locked condition, then grips the entire arrangement to lock the section together, following which he can move onto the next junction.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fitting for Electrical Metallic Tubing conduit, Intermediate Metallic Conduit, and rigid conduit comprising in combination:

a body having an annular pocket with a central axis, the pocket being dimensioned and configured to slide onto a smooth ungrooved end of a conduit section, an opening in the body, a cam support on the body adjacent the opening, a cam lock pivotably fixed in the cam support, the cam lock having a cam surface on one end and an opposite end free for rotation of the cam surface, the cam lock being pivotable in the cam support between:

(a) a locked position in which the cam surface protrudes through the opening sufficiently to deform the surface of a conduit section when inserted and thereby lock the fitting and conduit section together, and (b) an unlocked position in which the cam is withdrawn sufficiently into the opening to allow insertion or removal of the conduit from the pocket.

2. The fitting of claim 1 in which the cam lock has an intermediate position in which the cam surface protrudes through the opening but not so far as in the locked position, but sufficiently far to engage a conduit section when positioned in the pocket for preliminarily locking the fitting and conduit section together.

3. The fitting of claim 2 in which the opposite end of the cam lock is positioned for rotation between the intermediate and locked positions of less than ninety degrees so that said opposite end can be moved from the intermediate position to the locked position by gripping the conduit body and opposite end with a pair of pliers.

4. The fitting of claim 1 in which the cam surface has at least one projection for engaging and locally deforming the surface of a conduit section when inserted and locked.

5. The fitting of claim 4 which the projection is arranged with respect to the pivot axis of the cam lock to pivot past a plane which is normal to the body and passes through the pivot axis.

6. The fitting of claim 1 in which the cam surface has multiple serrations along at least a portion thereof for enhancing gripping to the conduit section.

7. The fitting of claim 1 in which the opposite end of the cam lock is sufficiently long to be engageable by a pair of pliers gripping both the body and the handle.

8. The fitting of claim 1 in which the opening in the body is a slot generally parallel to the axis of the body.

9. The fitting of claim 1 in which the cam support comprises a pair of flanges apertured to pivotably receive the cam lock.

10. The fitting of claim 1 in which the cam surface has at least one projection positioned to engage the surface of a conduit section when inserted in the fitting, the projection being positioned to carry the conduit section into the pocket.

11. The fitting of claim 1 in which the body has two said pockets and two openings, and including two said cam locks, the openings and the cam locks being positioned near opposite ends of the fitting for providing a coupling to join two conduit sections.

12. A method of connecting a conduit section into a conduit assembly comprising the steps of:

provdiing a conduit section having a smooth ungrooved end to be connected into the conduit assembly, providing a conduit fitting having a cam lock arrangement with a pivot lock having a cam surface on one end for locking/releasing the smooth ungrooved end of the conduit section, and an operating lever on the other end, inserting the conduit section into the fitting and while holding the conduit and fitting in the appropriate position, moving the operating lever to achieve a preliminary grip on the conduit, and clamping the operating lever toward the fitting body to drive the can into the smooth ungrooved surface of the conduit thereby to lock the fitting and conduit together.

13. The method of claim 12 in which the steps of inserting and clamping are performed, at least in part, using a pair of channel pliers.

14. The method of claim 12 in which the cam surface has at least one projection formed thereon, and the clamping step drives the at least one projection into the surface of the conduit.

15. A fitting for Electrical Metallic Tubing conduit, Intermediate Metallic Conduit, and rigid conduit comprising in combination:

a body having an annular pocket with a central axis, the pocket being dimensioned to slide onto a smooth end of a conduit section, an opening in the body, a cam support on the body adjacent the opening, a cam lock pivotably fixed in the cam support, the cam lock having a cam surface on one end and an opposite end free for rotation of the cam surface, the cam surface having at least one projection for engaging and locally deforming the surface of a conduit section when inserted and locked, the cam lock being pivotable in the cam support between:
(a) a locked position in which the cam surface protrudes through the opening sufficiently to deform the surface of a conduit section when inserted and thereby lock the fitting and conduit section together; and
(b) an unlocked position in which the cam is withdrawn sufficiently into the opening to allow insertion or removal of the conduit from the pocket.

* * * * *